United States Patent [19]

Hetchler

[11] 3,774,747

[45] Nov. 27, 1973

[54] COMBINING CONVEYOR ARRANGEMENT FOR ARTICLES SUCH AS CANS

[75] Inventor: Neal F. Hetchler, Milwaukee, Wis.

[73] Assignee: Jos. Schlitz Brewing Company, Milwaukee, Wis.

[22] Filed: May 3, 1971

[21] Appl. No.: 139,367

[52] U.S. Cl. ................................................. 198/32
[51] Int. Cl. ............................................ B65g 47/26
[58] Field of Search ....................... 198/30, 32, 188

[56] References Cited
UNITED STATES PATENTS

| 3,109,529 | 11/1963 | Carter | 198/30 |
| 2,753,975 | 7/1956 | Day et al. | 198/32 |
| 2,369,557 | 2/1945 | Gettelman | 198/188 X |
| 3,628,647 | 12/1971 | Beard | 198/30 |
| 3,117,665 | 1/1964 | Mekola et al. | 198/30 |

Primary Examiner—Richard E. Aegerter
Assistant Examiner—Douglas D. Watts
Attorney—Andrus, Sceales, Starke & Sawall

[57] ABSTRACT

The disclosure provides for at least one of the opposed side rail guides of the combining conveyor arrangement being resiliently supported to provide for movement of the side rail guide primarily in response to the pressure of the articles advancing on the combining path. The disclosed combining conveyor arrangement further provides for automatic ejection or removal of fallen articles from the combining path.

3 Claims, 7 Drawing Figures

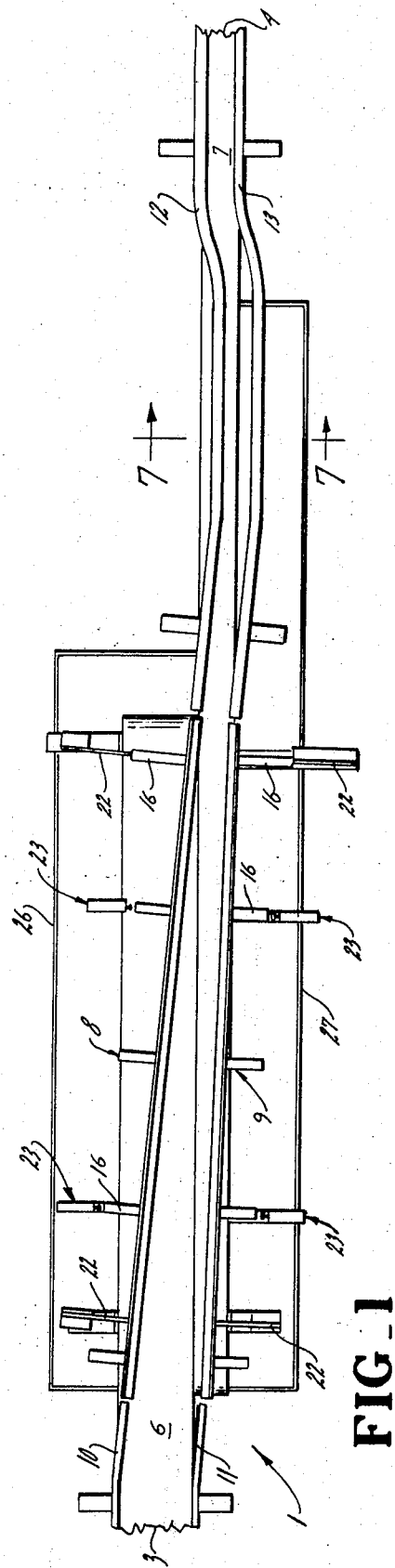
FIG_1
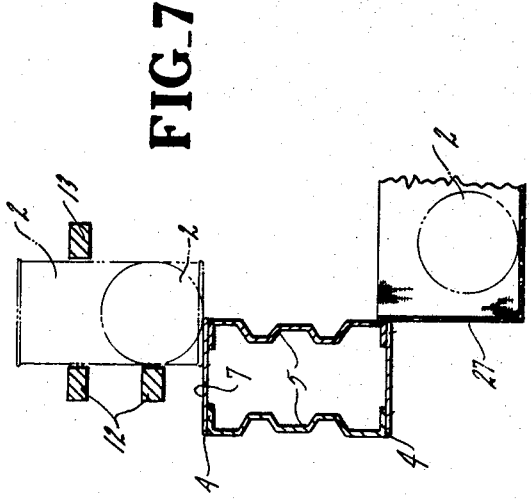
FIG_7
INVENTOR.
NEAL F. HETCHLER
BY
Attorneys

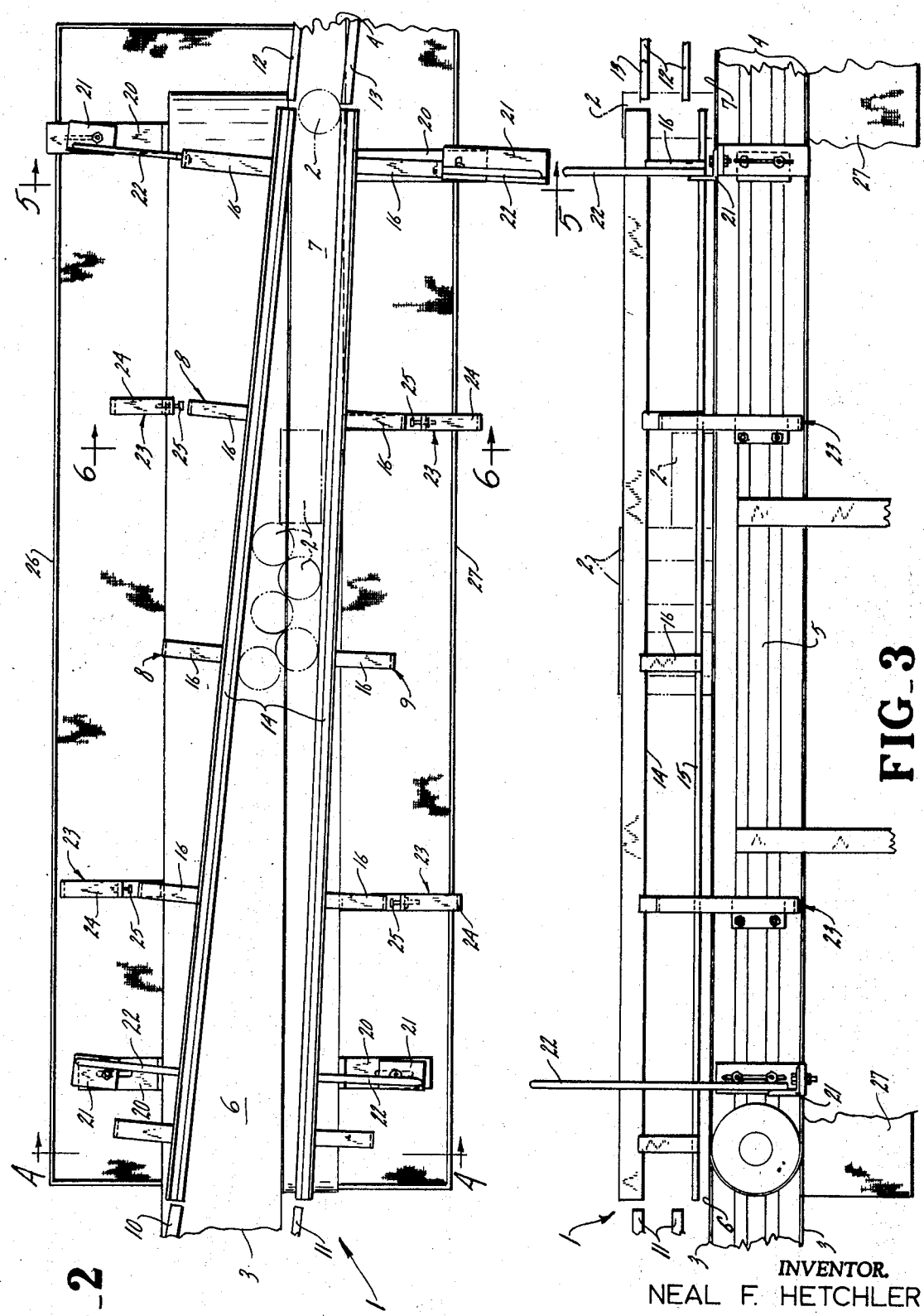

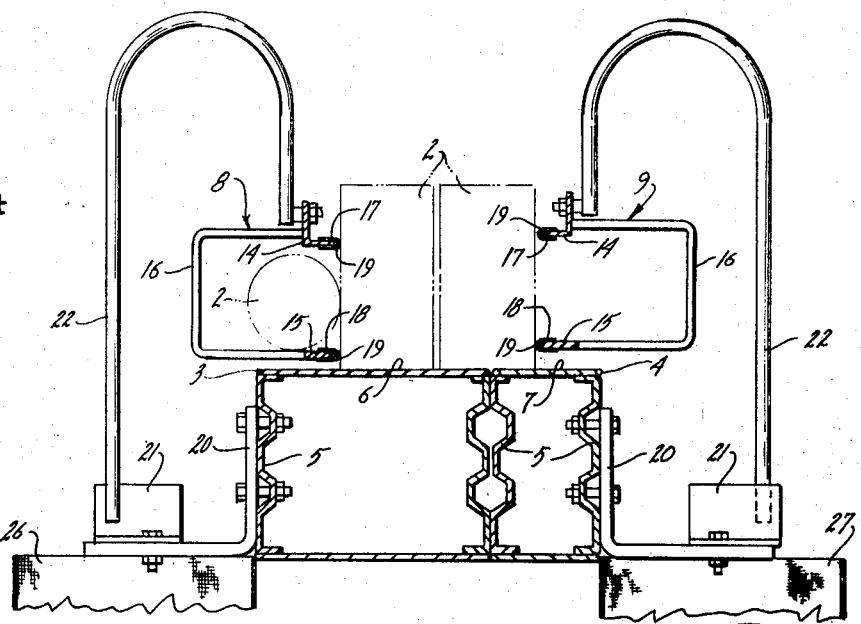
FIG_4
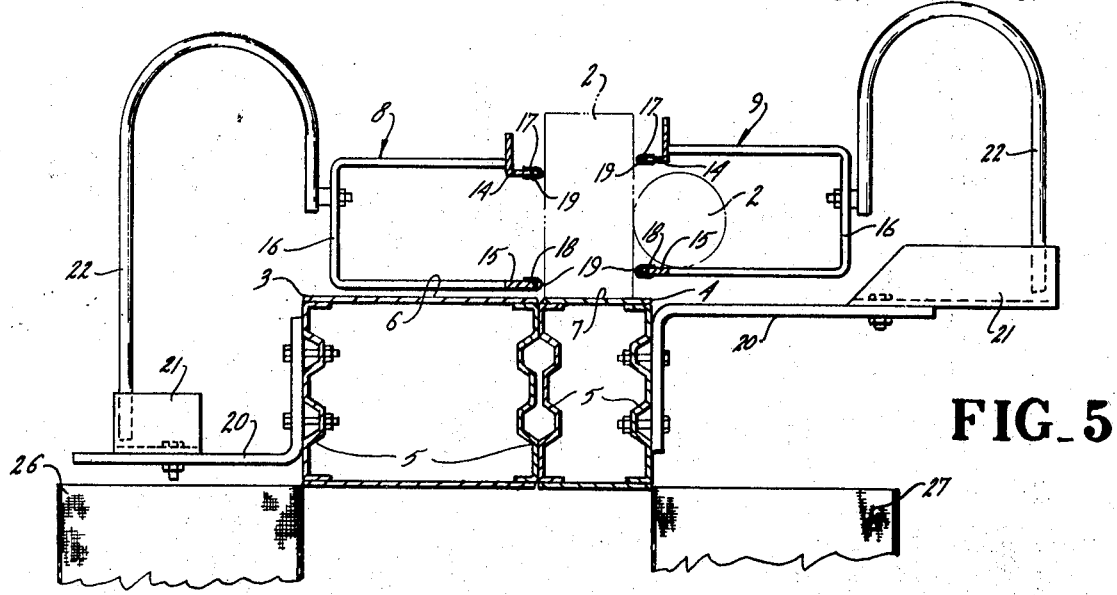
FIG_5
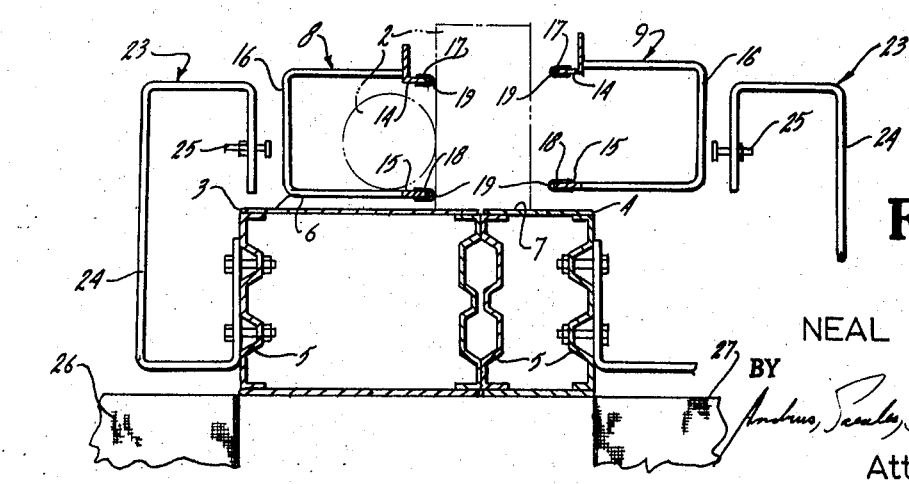
FIG_6
INVENTOR.
NEAL F. HETCHLER
BY
Attorneys

COMBINING CONVEYOR ARRANGEMENT FOR ARTICLES SUCH AS CANS

BACKGROUND FOR THE INVENTION

This invention relates to a combining conveyor arrangement for articles such as cans wherein the articles are received in batches, orderly banks or haphazard array forming a random mass at the intake end of the arrangement and are so handled or regulated to provide for single file delivery at the discharge end of the arrangement.

In the brewing, bottling and other industries, processing machinery is often served by an article combining conveyor arrangement. Unless article delivery to the processing machinery is generally orderly and uninterrupted, production efficiency is likely to suffer.

Heretofore the possibility of articles becomming jammed in a combining conveyor arrangement was always a serious problem. Unless the cause of a jam was promptly cured, the accumulation of articles could rapidly become so massive as to require shutdown of production facilities upstream for lack of conveyor space. The production facilities downstream would also likely be affected by slowdown or interruption for lack of articles for processing. Since the correction for a jam depended in large measure on manual observation and dexterity, production line efficiency sometimes left much to be desired.

The phenomenon of jamming results when the articles being combined form a bridge or become wedged between the side rails forming the combining path. While fallen articles frequently give rise to jamming, two or more upright articles can also become so aligned laterally as to wedge themselves between the rails across the combining path to thereby dam the flow of articles on the combining conveyor arrangement. It is generally an object of this invention to provide an improved combining conveyor arrangement wherein jamming is substantially prevented.

SUMMARY OF THE INVENTION

The invention is applied to a combining conveyor arrangement wherein a pair of endless conveyors are operably disposed on a suitable frame in side-by-side relation with the upper reach of the conveyors providing article carrying surfaces at a common elevation. One of the conveyors of the arrangment is an intake or supply conveyor while the other conveyor is an output or discharge conveyor. A first side rail guide extends diagonnally with respect to the supply conveyor with the downstream end thereof disposed adjacent to the discharge conveyor. A second side rail guide is disposed generally laterally opposite from the first side rail guide and extends diagonally across the discharge conveyor with the upstream end thereof disposed adjacent to the supply conveyor. The side rail guides together from a converging combining path over the conveyors for receiving articles in random mass at the upstream end thereof on the supply conveyor for single file delivery at the downstream end thereof on the discharge conveyor.

Broadly according to the invention, at least one of the opposed side rail guides of the combining conveyor arrangement is resiliently supported from the frame to provide for movement of the side rail guide primarily in response to the pressure of the articles advancing on the combining path. The invention further provides for automatic ejection or removal of fallen articles from the combining path.

DESCRIPTION OF THE DRAWING FIGURES

The drawings furnished herewith illustrate the best mode for carrying out the invention as presently contemplated and set forth hereinafter.

In the drawings:

FIG. 1 is a partial top plan view of the article combining conveyor arrangement of this invention showing at least as much as will be necessary to a full understanding of the invention;

FIG. 2 is an enlarged top plan view showing in greater detail the resiliently mounted side rail guides of the combining conveyor arrangement;

FIG. 3 is generally a side elevational view of the structure shown in FIG. 2;

FIG. 4 is an enlarged sectional view taken generally on line 4—4 of FIG. 2;

FIG. 5 is an enlarged sectional view taken generally on line 5—5 of FIG. 2;

FIG. 6 is an enlarged sectional view taken generally on line 6—6 of FIG. 2; and

FIG. 7 is an enlarged sectional view taken generally on line 7—7 of FIG. 1.

DESCRIPTION OF THE ILLUSTRATED EMBODIMENT

Referring to the drawings, the article combining conveyor arrangement 1 is particularly adapted for handling cans 2 and comprises an intake or supply conveyor 3 and a delivery or discharge conveyor 4 disposed in side-by-side relation and operably carried on a suitable frame 5. The upper reach of the endless chain conveyors 3 and 4 are at the same elevation and provide the article carrying surfaces 6 and 7 for advancing the articles such as cans 2 between a pair of side rail guides 8 and 9 which are disposed to define a converging or funnel-shaped path for combining the articles to provide for single file discharge or delivery.

To attain maximum production line efficiency, the conveyor arrangement 1 must deliver articles 2 in an orderly and uninterrupted manner generally in accordance with the operational needs of the processing machinery, not shown, it serves. Since the discharge conveyor 4 provides for single file delivery, it may be relatively narrow and must be able to operate at relatively high speed. The intake conveyor 3, adapted to handle a mass flow of articles 2 from one or more preceding processing machines and/or an accumulator table, neither of which are shown, is wider than conveyor 4 and operates at a slower speed.

The side rail guide 8 extends diagonally across the intake or supply conveyor 3 with the downstream end of rail 8 terminating adjacent to the discharge conveyor 4. The side rail guide 9 is disposed generally laterally opposite from the rail 8 and extends diagonally across the delivery or discharge conveyor 4 with the upstream end of rail 9 being adjacent to the near edge of the supply conveyor 3. Thus, the side rail guides 8 and 9 define a flow or combining path for the articles 2 which is relatively wide upstream on the supply conveyor 3 and converges to a relatively narrow path downstream on the discharge conveyor 4.

The side rail extensions 10 and 11 are disposed oppositely along the corresponding edges of the supply conveyor 3 and extend upstream from the adjacent ends of rail guides 8 and 9 to form the upstream end of the flow path. Downstream from side rail guides 8 and 9, the single file flow path continues between the generally parallel side rail extensions 12 and 13 on the discharge conveyor 4.

The upstream rail extensions 10 and 11 are generally fixed, but may be vertically adjustable, and preferably comprise a pair of vertically spaced bars as generally shown in FIG. 3. The height of the rail extensions 10 and 11 and their relation to the article carrying surface 6 of conveyor 3 provides flow confinement for a mass of articles such as cans 2, even for those cans that may have tipped or fallen over onto their side.

The side rail guides 8 and 9 each comprise a pair of vertically spaced rails 14 and 15 which are connected by a plurality of longitudinally spaced generally U-shaped connecting members 16. The U-shaped members 16 are oriented to place the legs thereof in vertically spaced relation with the rails 14 and 15 being secured to the corresponding leg of the connecting members. As shown in the drawings, the upper rail 14 of guides 8 and 9 preferably comprises an angle section member having horizontal and vertical portions disposed generally normal to each other. The horizontal portion of rail 14 projects inwardly toward the flow path to form a longitudinally extending lip 17 for engagement by the articles 2. The lower rail 15 comprises a generally flat strip-like member providing a longitudinally extending lip 18 spaced vertically beneath the lip 17 of the upper rail 14. The lips 17 and 18 of the respective rail guides 8 and 9 engage the articles 2 forced into sliding contact therewith at two vertically spaced points to impose relatively little frictional resistance on the articles. To further reduce the frictional resistance on the articles 2 in contact with the rail guides 8 and 9, a wear strip 19 of nylon or other suitable plastic may cover the respective lips 17 and 18.

The vertically spaced rails 14 and 15 as well as the legs of the U-shaped member 16 are spaced apart a distance at least exceeding the diameter of the articles 2 so that articles with their central axis disposed at or near the horizontal, as in the case of a fallen article, can pass between the spaced rails. While the depth of the U-shaped members 16 may vary along the length of the side rail guides 8 and 9, the distance of the central connecting leg of members 16 from the rails 14 and 15 should at least exceed the diameter of the articles 2 so that the members 16 will not impede or prevent the passage of articles between the rails.

The side rail guides 8 and 9 are resiliently supported from the frame 5 in spaced relation to the article carrying surfaces 6 and 7 of the respective conveyors 3 and 4. The support means for the guides 8 and 9 include an angle frame projection or bracket 20 secured to the frame 5. The respective brackets 20 project outwardly from the frame 5 for mounting the blocks 21 securing the lower end of corresponding inverted, generally J-shaped torsion spring members 22. The J-shaped spring members 22 extend upwardly from the respective blocks 21 and loop over in an inward direction to support the corresponding rail guides 8 and 9 from the depending short leg of members 22.

The rail guides 8 and 9 are each supported by a pair of the spring members 22 disposed generally adjacent the respective ends of the guides. As generally shown in FIG. 2, the spring support members 22 for the rail guide 8 are preferably substantially laterally aligned with the spring support members for rail guide 9. The spring members 22 are secured to the upper rails 14 at the upstream end of the respective side rail guides 8 and 9 and to the central connecting leg of the U-shaped rail connecting member 16 at the downstream end of the rail guides.

The torsion spring members 22 supporting the rail guides 8 and 9 provide a resilient mounting for the guides to serve a useful purpose in the combining process. Primarily due to the pressure of the mass of articles such as cans 2 in the combining path between the rail guides 8 and 9, a generally eccentric motion largely in a horizontal plane is imparted to the torsionally supported rail guides. The eccentric movement of the independently supported rail guides 8 and 9 provides a sort of kneading action on the articles 2 causing adjacent articles to slide or roll on each other in the converging combining path between the rail guides to thereby substantially eliminate the possibility of bridging or wedging by two or more articles aligned laterally between the rail guides which likely could cause a jam.

The motion imparted to the rail guides 8 and 9 may be generally tailored in accordance with the selection of the torsion spring members 22. As generally shown in FIG. 4, the long legs of the J-shaped members 22 supporting the respective rail guides 8 and 9 near their upstream end are relatively long and therefore more easily deflected to provide for correspondingly greater movement. The corresponding spring legs of members 22 near the downstream end of rail guides 8 and 9 are considerably shorter as shown in FIG. 5, to provide for correspondingly less movement at that location to properly direct the single file flow of articles 2 into the path between the downstream rail extensions 12 and 13. It will be noted in FIG. 5, that the spring leg of member 22 supporting the downstream end of rail guide 9 is so short that the angle frame bracket 20 was inverted to accommodate torsion spring member 22. Some factors which enter into the selection of the torsion spring member 22 include the size and/or weight of the articles such as cans 2, and whether the same are full or empty.

On occasion processing equipment, not shown, downstream from the combining conveyor arrangement 1 may fail or be shut down for some other reason while the articles 2 back up or continue to accumulate, at least momentarily, on the combining conveyor arrangement. Under such circumstances the pressure of the articles 2 on the rail guides 8 and 9 is likely to exceed that normally encountered by the rail guides during normal combining operation and the spring members 22 will bend and/or twist more than usual in response to the increased pressure. A resilient backup or stop means 23 are provided on the combining conveyor arrangement 1 to limit the outward motion or travel of the rail guides 8 and 9 to thereby limit the deflection imposed on the spring members 22. The stop means 23 take the form of a generally rectangular, interrupted loop member 24 the lower portion of which is secured to the frame 5 and the upper portion of which has a depending leg for disposal in spaced relation and generally opposite from a corresponding U-shaped rail connecting member 16 generally shown in FIG. 6. The depending leg of the loop member 24 is outfitted with an adjusting screw 25 which may be set for a given distance from the corresponding U-shaped connecting member 16.

As perhaps best shown in FIG. 2, the rail guides 8 and 9 are each provided with a pair of longitudinally spaced backup or stop means 23 engageable by corresponding U-shaped connecting members 16. With the screws 25 set according to preferred adjustment, the stop means 23 are rarely if ever contacted by the corresponding U-shaped members 16 during normal operation of the combining conveyor arrangement 1. The backup or stop means 23 do come into play, for example, following a failure or shutdown downstream when the articles such as cans 2 accumulate on the combining conveyor arrangement 1 to impose a pressure on the opposed rail guides 8 and 9 which exceeds normal. Under those circumstances, the backup, or stop means 23 will be engaged by the rail guides 8 and 9 and will deflect together with the spring members 22 to provide a balancing pressure on the rail guides to offset the pressure of the accumulating articles 2 and thereby substantially freeze the rail guides in position for the duration of the shutdown. When operation is again resumed, the energy stored in the deflected backup or stop means 23 assists the spring members 22 initially to rapidly restore the combining conveyor arrangement 1 to the condition of normal operation.

While articles such as cans 2 are generally very stable on the combining conveyor arrangement 1, provision is made for the automatic ejection or removal of tipped over or fallen cans as may arrive between the rail guides 8 and 9 from upstream where a curve on the flow path and/or certain processing machinery, neither of which is shown, may have given rise to the presence of some fallen cans. As indicated hereinbefore, all cans 2, including fallen cans entering the combining path between the upstream rail extensions 10 and 11 will continue to advance on the supply conveyor 3 to the position between the rail guides 8 and 9.

In the mounting of rail guides 8 and 9, the lower rails 15 are disposed in spaced relation above the corresponding article carrying surfaces 6 and 7 of conveyors 3 and 4 a distance which is less than the radius of the cans 2. Thus, a fallen can 2 advancing in the combining path and contacting the lower rail 15 of rail guides 8 or 9, is engaged by the lower rail beneath its horizontal diameter. With the lower rails 15 supported to engage beneath the horizontal diameter of fallen cans 2, most fallen cans advancing on the combining path between rail guides 8 and 9 are forced by the pressure of combining cans to slide or roll up and over the lips 18 of either lower rail 15 for expulsion or ejection from the combining path through the clearance or space between the upper rail 14 and corresponding lower rail of the rail guides. The expelled or ejected fallen cans 2 are generally caught in the containers 26 and 27 disposed on opposite sides of the combining path adjacent to the respective conveyors 3 and 4 as shown in the drawings.

On occasion a fallen can 2 will find itself advancing between the rail guides 8 and 9 generally laterally or with its axis generally normal to the direction of travel on the combining path. In the extreme case, the respective ends of the fallen can 2 will be in contact with the lips 18 of the opposed lower rails 15 of rail guides 8 and 9. If the frictional resistance imposed by the opposed rails 15 on the ends of a laterally disposed fallen can 2 is substantially equal, the pressure of combining is likely to wedge the can more solidly between the lower rails to cause a jam on the combining path.

In an effort to avoid imposing a substantially equal frictional resistance on a laterally disposed fallen can 2 in contact with the opposed lower rails 15 of rail guides 8 and 9, the lower rails are placed at different heights relative to the article carrying surfaces 6 and 7 of the respective conveyors 3 and 4. As shown in the drawings, the lower rail 15 of rail guide 8 is at a lesser height relative to its article carrying surface 6 than is the lower rail guide 9 relative to the article carrying surface 7. Because the lower rail 15 of rail guide 8 makes contact with an end of a laterally disposed fallen can 2 at a lower level than does the lower rail of rail guide 9, it strikes a lesser chord on the end of a can and therefore imposes a lesser frictional resistance than does the lower rail of rail guide 9. With an unbalanced frictional resistance imposed on the respective ends of a laterally disposed fallen can 2 by the opposed lower rails 15 of rail guides 8 and 9, the pressure of combining is likely to dislodge the can and so prevent a jam on the combining path.

While certain dimensions of the combining conveyor arrangement 1 may have to be varied in accordance with the size, shape and fill condition of cans 2, it has been found that for filled and sealed cans of 12 ounces capacity and having a diameter of approximately 2 ⅝ inches, expulsion or ejection of fallen cans through the vertically spaced rails 14 and 15 by the pressure of combining will be very effective when the lower rail 15 is disposed about ¾ inch above the corresponding article carrying surface. With the lower rail 15 of rail guide 9 disposed about ¾ inch above the article carrying surface 7 and the lower rail of rail guide 8 disposed about one-half that high or ⅜ inch above the article carrying surface 6, the same filled cans 2 of 12 ounces capacity were effectively dislodged by the pressure of combining when fallen on the combining path and disposed laterally in contact with the opposed lower rails. The rail guides 8 and 9 are adapted to be varied laterally and vertically as needed to accommodate cans 2 of different shape, size and fill condition.

When a fallen can 2 is disposed generally longitudinally or with its axis generally parallel to the direction of travel on the combining path and the fallen can somehow escapes ejection during its advance between the rail guides 8 and 9, as perhaps might happen when the mass of cans arriving between the rail guides is momentarily relatively small and incapable of exerting an effective combining pressure, such can will continue to advance on the conveyor 4 into the single file flow path formed between the downstream rail extensions 12 and 13 along with any upright cans. Thus, provision must be made downstream from rail guides 8 and 9 for the elimination of any remaining fallen cans 2 from among the upright cans delivered downstream.

For elimination of any remaining fallen cans 2, the generally parallel downstream rail extensions 12 and 13 form a single file tortuous path on the discharge conveyor 4 as generally shown in FIG. 1. As generally shown in FIG. 7, the rail extension 12 may comprise a pair of vertically spaced bars with the lower of the two bars being disposed at a height generally corresponding to the horizontal diameter of a fallen can 2, shown in phantom lines, on the article carrying surface 7 of the discharge conveyor 4. The opposed downstream rail extension 13 may comprise a single bar spaced above the article carrying surface 7 a distance at least exceeding the diameter of a fallen can 2 as indicated in FIG. 7.

The single file tortuous path defined by the opposed downstream rail extensions 12 and 13 extends from the downstream end of rail guides 8 and 9 and startes with a diagonally extending portion to carry the articles such as the cans 2 to a position laterally offset with respect to the centerline of the discharge conveyor 4. At the downstream end of the diagonally extending portion, the cans 2 are forced to ride the conveyor 4 with more than one-half of the can projecting over the edge of the conveyor as generally shown in FIG. 7. Downstream from the diagonally extending portion, the tortuous single file path continues with a portion wherein the rail extensions 12 and 13 remain laterally offset with respect to the centerline of the discharge conveyor 4 and extend generally parallel to the conveyor so that the cans 2 will continue to advance with more than one-half of the can projecting over the edge of the conveyor. Beyond the parallel portion, the tortuous path continues with a curved portion wherein the rail extensions 12 and 13 redirect the single file flow path generally along the centerline of the conveyor 4 where the cans continue their advance toward the next processing machine, not shown.

Because the height of rail extension 13 relative to the conveyor 4 exceeds the diameter of the cans 2, any fallen cans entering the single file flow path between the rail extensions 12 and 13 are free to fall from the conveyor into the adjacent container 27 over the diagonally extending portion of the tortuous flow path. Any fallen cans 2 reaching the end of the diagonally extending portion of the flow path are thereafter crowded off of the conveyor 4 on the parallel portion of the flow path by the lower bar of rail extension 12 which is disposed to assure that more than one-half of each fallen can will project beyond the edge of the conveyor for removal by gravity. The fallen cans 2 removed from the conveyor 4 on the parallel portion of the flow path are also intercepted by the container 27 which extends generally to the end of the parallel portion of the flow path. Beyond the parallel portion of the tortuous flow path, the combining conveyor arrangement 1 provides for orderly single file delivery for further processing.

The combining conveyor arrangement 1 of this invention is capable of providing the desired orderly and uninterrupted flow of articles 2 necessary for an efficient production line. The speed and flow rate capability of the arrangement 1 makes it adaptable for use where previously two prior art combining conveyor arrangements were necessary. The provision for automatic removal or ejection of fallen articles 2 from the combining path substantially prevents jams which heretofore frequently means a slow down or interruption of production.

Various modes of carrying out the invention are contemplated as being within the scope of the following claims which particularly point out and distinctly claim the subject matter which is regarded as the invention.

I claim:

1. In a combining conveyor arrangement for combining articles such as cans received in a random mass and providing for their single file delivery, a frame, a pair of endless conveyors operably disposed on said frame in side-by-side relation with the upper reach of said conveyors providing article carrying surfaces at a common elevation, one of said conveyors being a supply conveyor and the other of said conveyors being a discharge conveyor, a first side rail guide extending diagonally with respect to the supply conveyor with the downstream end thereof disposed adjacent to the discharge conveyor, a second side rail guide disposed generally laterally opposite from the first side rail guide and extending diagonally across the discharge conveyor with the upstream end thereof disposed adjacent to the supply conveyor, said side rail guides together providing a converging combining path over the conveyors for receiving articles in random mass at the upstream end thereof on the supply conveyor for single file delivery at the downstream end thereof on the discharge conveyor, and a pair of inverted, generally J-shaped torsion spring members supporting each of said side rail guides from said frame and in spaced ralation above the article carrying surfaces of the conveyors to provide for movement of said side rail guides primarily in response to the pressure of the articles advancing on the combining path, the long leg of each said J-shaped spring member being disposed generally vertically with the lower end of said long leg being connected to the frame, and the short leg of each said J-shaped member being connected to the corresponding side rail guide.

2. In a combining conveyor arrangement for combining articles such as cans received in a random mass and providing for their single file delivery, a frame, a pair of endless conveyors operably disposed on said frame in side-by-side relation with the upper reach of said conveyors providing article carrying surfaces at a common elevation, one of said conveyors being a supply conveyor and the other of said conveyors being a discharge conveyor, a first side rail guide extending diagonally with respect to the supply conveyor with the downstream end thereof disposed adjacent to the discharge conveyor, a second side rail guide disposed generally laterally opposite from the first side rail guide and extending diagonally across the discharge conveyor with the upstream end thereof disposed adjacent to the supply conveyor, said side rail guides together providing a converging path over the conveyors for receiving articles in random mass at the upstream end thereof on the supply conveyor for single file delivery at the downstream end thereof on the discharge conveyor, and a pair of torsion spring members supporting each of said side rail guides from said frame and in spaced relation above the article carrying surfaces of the conveyors to provide for movement by said side rail guides primarily in response to the pressure of the articles advancing on the combining path, the torsion spring members disposed adjacent to the upstream end of the respective side rail guides being more flexible than the torsion spring members disposed adjacent to the downstream end of the side rail guides to provide for movements of greater magnitude at the upstream end of the rail guides than at the downstream end of the rail guides.

3. In a combining conveyor arrangement for combining articles such as cans received in a random mass and providing for their single file delivery, a frame, a pair of endless conveyors operably disposed on said frame in side-by-side relation with the upper reach of said conveyors providing article carrying surfaces at a common elevation, one of said conveyors being a supply conveyor and the other of said conveyors being a discharge conveyor, a first side rail guide extending diagonally with respect to the supply conveyor with the downstream end thereof disposed adjacent to the discharge conveyor, a second side rail guide disposed generally laterally opposite from the first side rail guide and extending diagonally across the discharge conveyor with the upstream end thereof disposed adjacent to the supply conveyor, said side rail guides together providing a converging combining path over the conveyors for receiving articles in random mass at the upstream end thereof on the supply conveyor for single file delivery at the downstream end thereof on the discharge conveyor, a pair of torsion spring members supporting each of said side rail guides from said frame and in spaced relation above the article carrying surfaces of the conveyors to provide for movement of said side rail guides primarily in response to the pressure of the articles advancing on the combining path, and stop means to generally limit the movement of the side rail guides in response to the pressure of the articles advancing on the combining path, said stop means being resilient to deflect and generally assist the torsion spring members to resist above normal pressures of combining.

* * * * *